April 6, 1965        W. S. BOMBA        3,176,675
HYDRAULIC CUTTING BLADES FOR STONE SAWING MACHINES
Filed Oct. 29, 1962        2 Sheets-Sheet 1
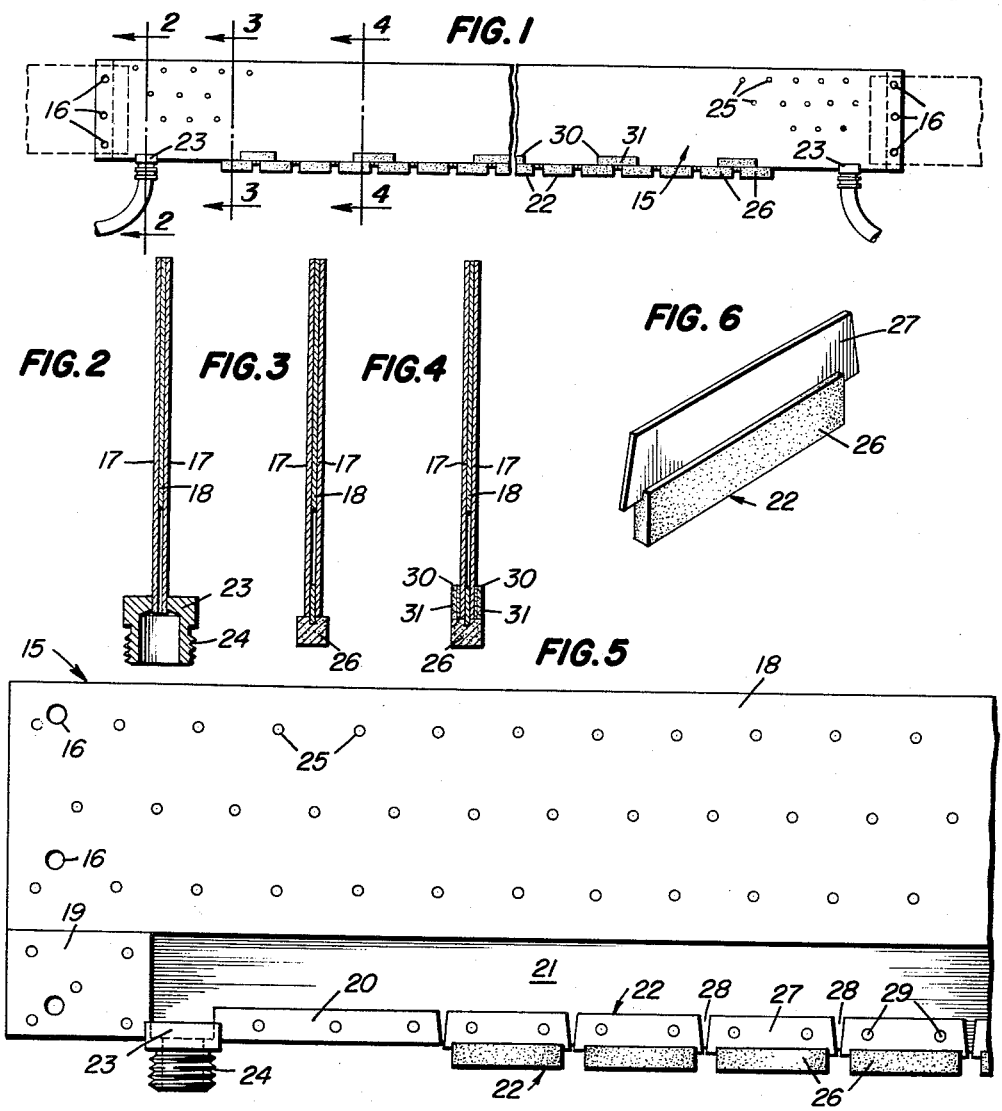
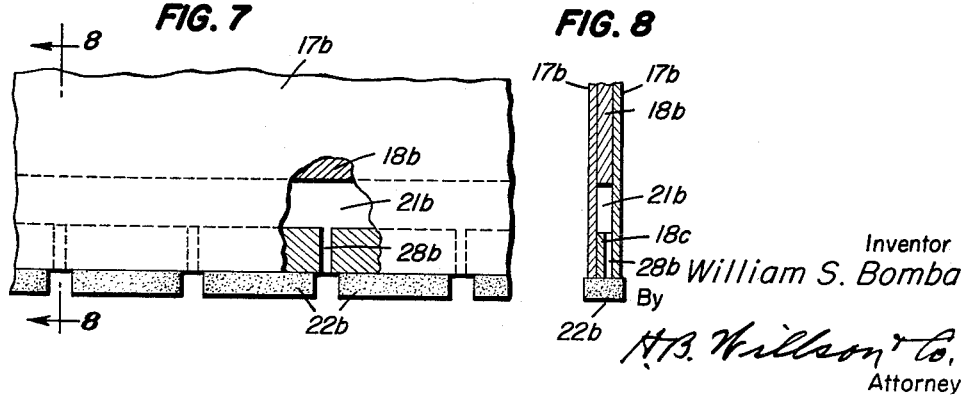
Inventor
William S. Bomba
By
H.B. Willson & Co.
Attorney April 6, 1965 W. S. BOMBA 3,176,675
HYDRAULIC CUTTING BLADES FOR STONE SAWING MACHINES
Filed Oct. 29, 1962 2 Sheets-Sheet 2

Inventor
By William S. Bomba

Attorney

United States Patent Office 3,176,675
Patented Apr. 6, 1965

3,176,675
HYDRAULIC CUTTING BLADES FOR STONE
SAWING MACHINES
William S. Bomba, R. R. 1, McCowan Road,
Agincourt, Toronto, Canada
Filed Oct. 29, 1962, Ser. No. 233,514
6 Claims. (Cl. 125—15)

This application is a continuation-in-part of my application Serial No. 165,104 filed January 9, 1962, now abandoned for Cutting Blades.

This invention relates to improvements in blades for cutting natural stone, concrete and other hard materials. Such blades or saws may be of the straight reciprocating type such as used on gang saw machines for cutting blocks of stone into slabs, or of the circular rotary type such as used in slab cut-off machines and in machines to cut green concrete.

Stone cutting gang saw machines have been used for many years to cut large blocks, say up to 10' or more in length and 5' high, into slabs of the desired thickness. Such machines may have as many as 50 or more parallel saw blades in a heavy saw frame mounted for horizontal reciprocation and gradual downward movement. The blades are not less than 3/16" metal plates, 6" or 7" wide and up to 20' or more in length with hardened teeth along their lower edges. In order to keep the blades straight in the reciprocatory or oscillatory saw frames, they are stretched under a tension of about 10 metric tons. Therefore the blades must be heavy and mounted in saw frames that cannot be reciprocated at high speeds. Consequently the machines cut stone very slowly, usually at about the rate of 1" to 2" per hour.

To facilitate the cutting operation silica sand or steel shot are sometimes used; and water is sprayed on the top of the stone to cool and lubricate the blades. However the water does not gravitate to the bottom of long and deep kerfs to a sufficient extent and with sufficient force to quickly and effectively carry off the stone cuttings and sludge. Hence the cutting action is slow and inefficient. The extent of the reciprocation of the blades is seldom more than twenty-one inches and consequently the stone cuttings and sludge are moved back and forth in the long kerfs, thereby not only impeding the cutting of the stone but also causing rapid wearing of the blades. In recent years such machines have been made to cut some kind of stone more rapidly and efficiently by using an improved form of cutting element instead of the hardened metal teeth. Such improved cutters are known as diamond segments or slugs; and they consist of diamond dust or particles held in a metallic matrix. However, due to the fact that the sludge containing the cuttings and chips remain so long in the bottom of the kerfs, the effective life of these expensive diamond segments is greatly reduced because the metal of the matrix in which the diamond particles or chips are embedded is rapidly worn away.

These diamond segments have been used more extensively on the circular or disk saws of cut-off and concrete sawing machines but their effective life has been short notwithstanding many proposals to make them last longer. The most generally used disk saw consists of a circular metal sheet or plate that is fixed to a rotary shaft and has arcuate diamond segments spaced around its periphery. The peripheral portion of the circular plate or core is formed with radial slots at points between the spaced ends of the segments to receive water and to facilitate the soldering or brazing of the segments to the edge of the disk without causing warping. These slots are a drawback because they tend to cause vibration which may chip valuable polished marble and because at times cracks occur in the blade at the inner ends of the slots. While water is sprayed on the blade, it does not always get to the bottom of deep kerfs in sufficient quantity to effectively remove the cuttings and sludge. Air currents around the periphery of the rotating blade tend to throw the water off. When the blade is not properly cooled and lubricated burning results, and hence with the conventional blade the depth of cut is limited and several passes of cuts may be necessary; and that consumes time. With these rotary saws as well as with the reciprocating saws as above noted, the lack of sufficient water directly between the stone and the diamond segments, not only makes the actual cutting operation slow and inefficient, notwithstanding the quantity of water that may be used, but reduces the life of both the blade and the segments.

One of the principal objects of the invention is to provide an improved stone cutting or sawing blade which overcomes the above indicated limitations of the presently used machines, by the forceful discharge of water in jets directly at the bottom of the kerf between the spaced cutting elements and in sufficient quantity to flush out the sludge and cuttings as fast as they are formed, thereby not only speeding up the cutting operation and reducing the cost thereof but also prolonging the useful life of the blade. The invention also contemplates a thin planar unitary cutting blade body, either reciprocatory or rotary, of such laminated formation that a narrow or reduced water passageway is formed within the body of the blade itself, the passageway being disposed along and being coextensive with an extended cutting edge along which are the spaced diamond segments, the water supplied to the passageway being forcefully discharged in jets between the segments and directly against the bottom of the kerf when the blade is in use, in order to effectively wash out the sludge and cuttings as fast as formed.

Another object of the invention is to provide a laminated blade of the above character having two opposed outer plates and an inner plate or plates so shaped as to from a water passageway along the cutting edge, the several plates being united by electric spot welding or other means. Hence the blade may be made of metal stampings that require no machining of grooves or channels, and the parts may be easily assembled and united by unskilled labor.

Another object is to provide a laminated reciprocatory blade of the above character which may be effectively used in a vertical position.

Another object is to provide on a long reciprocatory blade of the above character, means for preventing the blade from making a curved or non-straight cut in a stone block having a vein or portion that is harder than other portions of the block.

Another object is to provide for the spot welding of diamond segments to the thin metal plates of the blades without causing warping of the plates.

With the above and other objects and advantages which will later become apparent, the invention resides in the novel combinations and arrangements of parts and the novel features of construction hereinafter described and claimed, and illustrated in the accompanying drawings which show the present preferred embodiments of the invention.

In the accompanying drawings:

FIG. 1 is a side view of a reciprocatory blade constructed in accordance with the invention, a part being broken away;

FIGS. 2, 3 and 4 are detail vertical cross sectional views taken on the lines 2—2, 3—3 and 4—4 respectively of FIG. 1;

FIG. 5 is a view in side elevation and on an enlarged scale of one end of the blade shown in FIG. 1, with one of the outer plates removed;

FIG. 6 is a perspective view of one of the diamond segments;

FIG. 7 is a side view of a portion of a modified form of reciprocatory blade, with parts broken away and parts in section;

FIG. 8 is a sectional view taken on line 8—8 in FIG. 7;

Figure 9:
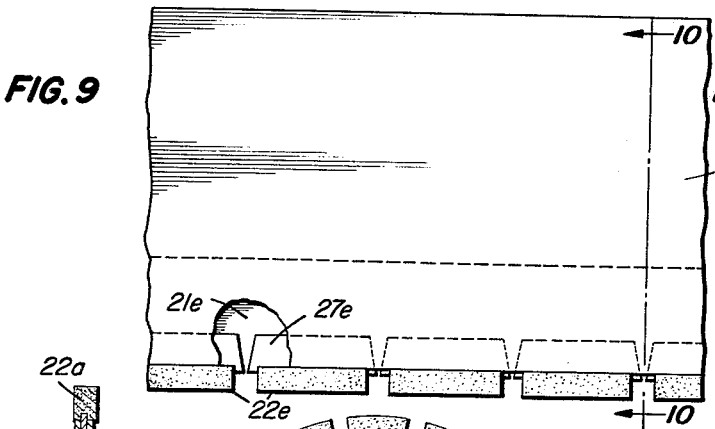
FIG. 9 is a side view, with parts broken away and in section, of another form of laminated blade in which only two plates are used.

It is to be noted that my improved blade is very thin, yet it has a water passageway coextensive with its cutting edge portion, such passageway being the result of the manner in which the blade is laminated from thin metal plates. In all of the illustrated embodiments of the invention the laminated blade has a planar body comprised of at least two opposed metal plates of the same size and shape and there is provided within the blade itself a closed water passageway which is coextensive with the cutting edge portion of the blade, the diamond segments being fixed in spaced end-to-end relation along the cutting edge portion and when the blade is in use, the water will be discharged from the passageway in fine forceful jets directly against the bottom of the kerf formed in the stone by the segments and at points between the opposed ends of adjoining segments. In the forms shown in FIGS. 1 through 10 the water is supplied to the passageway under a pressure of about 20 lbs. per square inch and is discharged through restricted passages, while in the rotary blade shown in FIGS. 11–13, it is centrifugal force caused by the rotation of the blade, that causes the water to be discharged in forceful jets. I have discovered that the forceful discharge of water from within the body of the moving blade and in jets directed against the bottom of the kerf between the diamond segments, causes my hydraulic blades to cut at an unexpectedly rapid rate, so that the cost of cutting stone or the like is far less than when the cutting is done by prior diamond segment blades.

Referring more in detail to FIGS. 1–6, the numeral 15 denotes the blade body which is of elongated rectangular shape. Since the blade is so thin, it is best supported and held under endwise tension by hydraulic tensioning means that is well known and diagrammatically represented by the dotted lines in FIG. 1. The body comprises two flat metal plates 17 preferably of equal size spaced apart in opposed relation by flat metal plate spacer means. While the latter might be a single suitably shaped plate, it is, as shown, composed of a main plate 18 and smaller plates 19 and 20. FIG. 5 shows the arrangement of the plates at one end of the blade and there is the same arrangement at the other end. The plate 18 is of the same length as the outer plates but an inch or two of less width, and when three of its edges are in register with the corresponding edges of the outer plates, the inner edge of plate 18 forms a portion of the boundary of an internal water passageway 21, the ends of which are closed by the inner edges of the plates 19, as will be understood on reference to FIG. 5. The other portion of the boundary of the passageway 21 is formed by the abrasive segments or slugs 22 which are preferably diamond segments and are spaced end-to-end along the cutting edge portion of the blade. In order to get a more even discharge of water from the blade throughout its length, the passages 28 may be larger along the middle or intermediate portion of the blade than the passages closer to its two ends. When it is desired to have the segment bodies 26 spaced further apart as above mentioned, the body 26 may be omitted from every other fin 27. When that is done, the restricted discharge passages 28 will still be formed between the opposed ends of adjoining fins. It will be noted that the plate 18 of the inner spacer means is of such large area that when its opposite faces are in contact with and united to the inner faces of the outer plates 17, the blade is in effect a solid blade with the narrow water passageway 21 only along the cutting edge. That not only permits the water passageway to be formed in a very thin blade but provides a strong blade that may be produced in an inexpensive manner. My straight reciprocatory blade is to be reciprocated in a straight line as it is pressed against the stone block and hence the working or cutting edges of the segment bodies 26 are always in contact with the bottom of the kerf but since the water is freely discharged directly into the spaces between the opposed ends of adjoining segment bodies, there is a free and unobstructed flow from the ends of the discharge openings 28 all the way to the ends of the kerf. It is to be further noted that since the water is forcefully discharged in small jets in said spaces, the slurry will be splashed up from the bottom of the kerf and may freely escape to the ends of the latter.

Adjacent to at least one end of the cutting edge portion of the blade, and preferably adjacent both ends, I braze a water inlet connection 23 which may be a tubular member with a screw threaded end 24 for the attachment of a flexible hose leading from a source of water under pressure. As shown in FIGS. 2 and 5 the connection is placed to admit water to the passageway 21 between spaced portions of the adjacent plates 19 and 20 of the inner spacer means.

The several plates 17, 18, 19 and 20 may be united by soldering, brazing or other means but I have shown at least the plates 17 and 18 united by suitably spaced electric spot welds indicated at 25. The plates are of cold rolled steel, preferably stainless steel with tensile strength close to 200,000 lbs. p.s.i. The blades will vary in size according to the work they are to perform but as one example of a gang saw blade, the three plates may each be .030″ thick so that the blade body will have a thickness of .090″, and to give the blade clearance the segments may be .125″ wide. The width or height of a blade, say 20′ long, may be 6″ or more depending upon the strength required. It is to be noted that by making the blade of laminated form, I may make it as thin or thinner than the old diamond segment blade and yet have within the body of the blade the main passageway for water or other coolant and lubricant.

In the past the diamond segments have been fastened to the cutting edge portion of both straight and circular blades by soldering or brazing since it has not been possible to spot weld them. While my improved diamond segments 22 may be soldered or brazed, I have shown them as being spot welded. That is made possible by molding in the metallic matrix of the elongated generally rectangular body portion 26 of the segments, thin longitudinally extending fins 27 of steel or other suitable metal. These fins are of generally rectangular shape and of greater length than the bodies 26, and their thickness is the same as the thickness of the intermediate plates 18, 19, 20. When the fins are inserted between the outer plates 17 with the opposed ends of adjoining fins in closely spaced relation, restricted water discharge passages 28 will be formed. If desired the projecting ends of the fins may be beveled as shown to form a small discharge opening, say twenty-five thousandths of an inch more or less. It is to be noted that the fins 27 also form a part of the said flat metal plate spacer means between the outer plates 17; and that the inner edges of the fins 27 form the boundary of the water passageway 21 along the cutting edge, the opposed boundary being formed by the inner edge of the large plate 18, as shown in FIG. 5. The water under pressure in the internal passageway 21 will be discharged in jets or streams between the segments and directly against the stone surface that is being cut. Two or three spot welds 29 may be used to fix the fins between the plates 17 with the segment bodies engaged with the bottom edge of the plates 17, but these parts may be otherwise united. In the old diamond segment blade the ends of the segment are spaced apart a substantial distance and that reduces the length of the actual cutting portion of the blade whereas in my improved blade the segment bodies may be closely spaced in some uses of the blade but the sludge and stone cuttings will be quickly and effectively flushed out of the kerf by the jet-like streams of water.

In the sawing of large stone blocks with a long straight thin blade such as FIG. 1, even though the blade is under high endwise tension, the blade may flex slightly when it encounters a harder vein or portion of the stone block and thus produce a slightly curved or wavy cut. That may be prevented by mounting on opposed sides of the blade parallel with the segments diamond clearance strips 30 shown in FIGS. 1 and 4. These clearance elements 30 are narrow rectangular strips of sheet metal with a coating 31 on one side face containing diamond dust or particles. The strips 30 have their opposite side faces soldered to the outer faces of the plates 17 at spaced intervals along the cutting edge portion of the blade with the lower edges of the strips engaging the portions of the segment bodies 26 that project beyond the outer faces of the plates 17, the coating 31 being flush with the outer side faces of the segment bodies. Any number of these clearance diamond strips may be placed on each side of the blade adjacent its middle or intermediate portion where the flexing is most harmful. As seen in FIG. 1 the few strips 30 are widely spaced and do not materially interfere with the upward flow of the water and stone cuttings after the jets strike the bottom of the kerf. It will be noted that since the width of the segment bodies are greater than the thickness of the blade, the stone cuttings or sludge may freely flow from the spaces between the segment bodies 26 first upwardly over the projecting portions of the outer faces of the thin plates or fins 27 and then along the outer faces of the side plates 17 and out of the ends of the kerf.

In the embodiment of the invention shown in FIGS. 7 and 8, the straight laminated blade comprises two outer plates 17$^b$ and inner plate spacer means consisting of two laterally spaced, longitudinally extending plates 18$^b$ and 18$^c$, the space between them forming a main longitudinally extending water passageway 21$^b$. The abrasive or diamond segments 22$^b$ are without fins and are soldered or brazed on the lower edges of the plates 17$^b$ and 18$^c$, as shown in FIG. 8; and they are in end-to-end spaced relation. Formed in one face of the plate 18$^c$ are longitudinally spaced bores or grooves 28$^b$ which form water discharge passages which open at one end into the passageway 21$^b$ and at the other end into the spaces between the opposed ends of adjoining segments.

Figure 10:
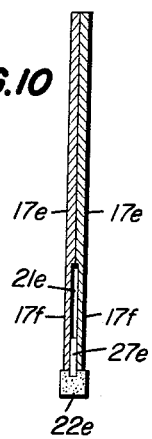
FIG. 10 is a sectional view on the line 10—10 in FIG. 9.

While in the preceding embodiments of the invention, the laminated blade is formed from three or more plates, it may be formed by only two plates as shown in FIGS. 9 and 10. In this form the two rectangular plates 17$^e$ may be made from a steel strip which has been rolled to provide along one side of it a thinned portion 17$^b$ so that when two pieces of the strip are assembled as shown in FIG. 10, the thin portions will form between them an internal longitudinally extending water passageway 21$^e$. The diamond segments 22$^e$ have fins 27$^e$ of the same thickness as the width of the passageway 21$^e$ and form one boundary of the latter. In all other respects this form of the invention is the same as in FIGS. 1–5.

Another important advantage of these straight laminated saw blades which contain the main longitudinally extending water passageway and the restricted and spaced water discharge passages, is that the blade may be used when it is in a vertical position. Vertically reciprocatory saws have decided advantages over those that move horizontally. A vertically reciprocating saw blade for cutting a stone block 10′ or 15′ long and 5′ high, can be made of less length than a horizontally reciprocating blade; the contact area of the blade with the stone will be smaller; the cut will be straighter; and since the weight of the vertically moving saw frame can be much lighter; it hence can be reciprocated about three times faster than a horizontally moving saw frame.

Figure 11:
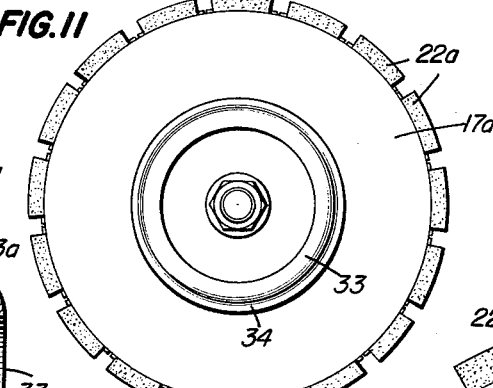
FIG. 11 is a side view of a rotary blade embodying the invention.
Figure 12:
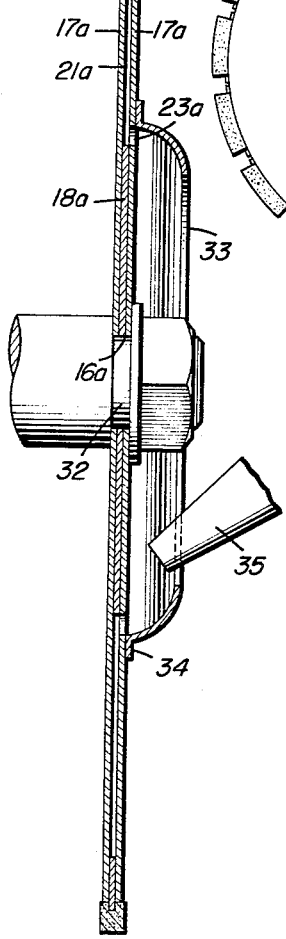
FIG. 12 is a central vertical sectional view on an enlarged scale of the blade shown in FIG. 11, showing it on a rotary shaft.
Figure 13:
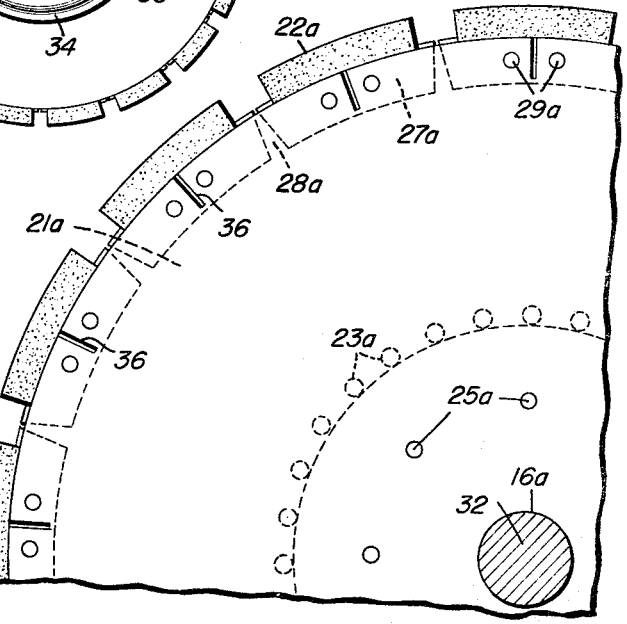
FIG. 13 is a side view of a portion of the rotary blade of FIGS. 11 and 12, on an enlarged scale.

The rotary saw blade shown in FIGS. 11–13 also comprises two outer plates 17$^a$ and a single inner or spacing plate 18$^a$, all of the plates being circular and having registering central openings 16$^a$ to receive a rotary shaft 32. The central spacer plate 18$^a$ is of less diameter than the outer plates and its edge forms a boundary portion of an internal water passageway 21$^a$ of annular form. The remainder of the boundary is formed by the closely spaced diamond segments 22$^a$ around the periphery of the blade. These segments have slightly arcuate shaped bodies but otherwise they are the same as the segments used on the straight blade. They have thin metal fins 27$^a$ inserted between the edges of the outer plates 17$^a$ and the opposed ends of adjoining fins are spaced to provide restricted water discharge passages 28$^a$.

Water is supplied to the passageway 21$^a$ through a concentrically arranged annular series of inlet holes 23$^a$ formed in one of the plates 17$^a$ and surrounded by an annular gutter-like water ring 33 carried by that outer plate. The dished ring 33 has an outwardly projecting flange 34 which is soldered, brazed or spot welded to the plate outwardly of the holes 23$^a$, and water is supplied to the ring by a suitably supported nozzle 35. When the circular blade is rotated centrifugal force will cause the forceful discharge of water in jets or streams from the restricted discharge passage 28$^a$. If desired the holes 23$^a$, the ring 33 and the nozzle 35 may be duplicated on the other side of this rotary blade. The use of the water ring eliminates expensive swivel type water attachments, the drilling of holes into shafts, etc. that have been used in the past to get water to rotary saw blades. My improved rotary blade will cut as fast as prior diamond segment rotary blades but the effective manner in which my hydraulic blade removes cuttings and sludge from between the cutting diamonds of the segments and the area of the stone being cut, greatly prolongs the useful life of the blade and the segments.

The three plates 17$^a$, 17$^a$ and 18$^a$ may be united to form a unitary device by suitably spaced spot welds 25$^a$. The segments 22$^a$ may be fastened by spot welding the fins 27$^a$ at two or more places to the outer plates as shown at 29$^a$ in FIG. 13. Since the fins 27$^a$ are closely spaced and the plates 17$^a$ are thin, I preferably form in the peripheral portions of the plates at points opposite the fins, one or more inwardly extending narrow and short expansion slots 36 and make the spot welds 29$^a$ close to these slots, in order to prevent the heat produced by the spot welding operation from warping the edge portions of the outer plates. That may also be done in spot welding the segments on the straight blade. After welding the slots are covered by the fins so that there is no likelihood of any vibration in the peripheral portion of the blade.

The size of the rotary blade will depend upon the work it is to do, but as a specific example, the outer disks 17$^a$ may have a diameter of 13½″ and be made of stainless steel .031″ thick while the inner disk may have a diameter of 3¼″ and a thickness of .050″. The body or core of these blades may be produced at a low cost by unskilled labor, and because of the laminated formation the blade may be thin and at the same time have an internal water passageway. The rotary blade may make a deep cut on a single pass of the blade through concrete or other hard material, and with no danger of the blade overheating since water is constantly and forcefully discharged from within the blade and directly at the bottom of the cut or kerf where the diamond segments do the cutting. Hence there is no problem of getting water into the kerf in sufficient amount to quickly remove the cuttings and sludge. The laminating not only provides the water passages but stiffens the blade, and by crossing the grain of the plates extra strength is gained. In larger blades at least, the water within the blade acts as a dampener to check vibration and tends to keep the blade straight so that it runs true.

My improved stone saw blades are not merely cutting blades but rather, hydraulic blades that carry the necessary water and forcefully discharge it at the very point it is most needed to cause the diamond segments to cut most effectively.

The laminated construction of the straight blade reduces the cost of the drag saw type gang saw machine blade and materially reduces its weight so that the machine may be operated at a faster rate of reciprocation. At the same time water in sufficient quantity and with sufficient force, will be supplied to the kerf, whether the blade is operated vertically or horizontally, and without regard to the speed of reciprocation, to flush out the stone cuttings and sludge in a manner that will enable the diamond segments to cut with the greatest effectiveness, since there will always be clean water in the bottom of the kerf. Actual tests of my improved diamond segment blades have demonstrated that they will make down cuts in marble and other stone at unexpected speeds and will very greatly reduce the cost of cutting natural stone. The most efficient old drag saw type diamond segment blades with water sprayed on top of the block, will cut marble at a down-feed rate of 8″ to 10″ per hour, while my diamond hydraulic reciprocating blades have on a slow speed machine cut marble and limestone at the rate of 36″ per hour, and on a faster experimental machine have cut marble at a down-feed rate of 90″ per hour and limestone 72″ per hour on a machine operating at 500 surface feet per minute.

Variations and modifications may be made within the scope of the following claims, and portions of the improvements may be used without others.

I claim:

1. In a thin laminated movable cutting blade for sawing stone or the like, the combination of
   (a) a thin blade body with a closed internal water passageway extending only along its cutting edge, a major portion of the total area of the body being solid, said blade body comprising,
      (1) two opposed thin metal outer plates of substantially the same size and shape,
      (2) elongated thin metal spacing plates disposed between and united to said outer plates along the cutting edge in end-to-end spaced relation and forming a part of the boundary of said passageway,
      (3) other thin metal plate spacing means disposed between and united to said outer plates and forming the remainder of the boundary of said passageway, such plate spacing means including at least one plate of large surface area which when united face to face with the opposed surfaces of the outer plates will make a major portion of the total area of the blade body solid,
   (b) elongated cutting segment bodies having diamond particles embedded in a metal matrix, such bodies being integrally united to said elongated spacing plates longitudinally thereof, and being disposed along the cutting edge in end-to-end spaced relation, said segment bodies being of generally rectangular shape with a transverse width greater than the thickness of the blade body,
   (c) said elongated spacing plates being of greater length than said segment bodies and having their ends projecting beyond the ends of the segment bodies, whereby spaces are formed along the cutting edge by the opposed ends of adjoining segment bodies,
   (d) restricted water discharge passages disposed along the cutting edge and formed by the close spacing of the opposed ends of the adjoining elongated spacing plates, said passages opening at one end into said passageway and at the other end into said spaces formed between the opposed ends of adjoining segment bodies, and
   (e) means for supplying water to said passageway, whereby when the blade is moved and water is supplied to the passageway, fine forceful jets of water will be freely discharged directly and freely into said spaces and against the bottom of the kerf to flush out the stone cutting as fast as they are formed and to replace them by clean water.

2. The combination of claim 1 in which said blade is a circular blade for mounting on a rotary shaft; said two outer plates are of circular shape and their peripheral portions form said cutting edge; said large plate of the spacing means is a circular plate of smaller diameter and forms one boundary of the said water passageway; and said means for supplying water to said passageway comprises a water receiving ring fixed to the outer face of one of said outer plates concentric therewith and forming an open gutter to receive water from a supply nozzle and an annular series of water inlet openings formed in said last mentioned outer plate concentric therewith and disposed within said water ring or gutter and opening into said passageway.

3. The combination of claim 1 in which said blade is a straight elongated rectangular blade for reciprocation in a straight line and one of its longitudinal edges forms said cutting edge; said two outer plates of the blade body are of rectangular shape; said one large plate of the plate spacing means is a rectangular plate of the same length as said outer plates but of slightly less width than said outer plates, whereby when these three plates are united with their end edges in register and with one longitudinal edge of the large plate in register with the corresponding longitudinal edges of the two outer plates there will be formed a solid blade body with said passageway along only the cutting edge; and said means for supplying water to said passageway comprises at least one tubular connection for a flexible water supply hose, said connection being fixed to said blade body and in communication with said passageway.

4. A laminated reciprocatory stone sawing blade of such thinness that it must be held stretched under high tension when reciprocated in a straight line in a stone sawing machine, comprising in combination
   (a) a thin straight rectangular blade body with a narrow closed internal water passageway extending only along its longitudinal cutting edge, the remaining and major portion of the blade body being solid, said body being of laminated formation and comprising
      (1) two opposed outer thin metal plates of substantially the same size and shape and having a thickness of approximately .030″, and
      (2) inner thin metal plate spacer means between said outer plates and comprising at least one large plate having a thickness of approximately .030″, and a large surface area, the opposite sides of such plate being united face to face with the opposed portions of the outer plates to make the major portion of the blade body of solid formation with the inner edge of said plate forming one boundary of said passageway.
   (b) a row of cutting segments disposed along the cutting edge, each comprising
      (1) an elongated generally rectangular body having diamond particles embedded in a metal matrix and
      (2) an elongated generally rectangular thin metal plate forming a part of said inner spacer means and of the same thickness as said large plate thereof, (3) said thin plates of the segments being of greater length than the segment bodies and each being integrally united to one of the bodies along the longitudinal center of one of the side faces thereof with its ends projecting beyond the ends of the respective body, said thin plates serving as attaching fins for the segment bodies, (c) means fastening the fins of the segments between said outer plates along the cutting edge and in end-to-end spaced relation to form the boundary of said passageway adjacent the cutting edge and to provide along the latter spaces formed by the opposed ends of adjoining segment bodies, (d) means for supplying water under pressure to said passageway, and (e) restricted water discharge passages along the cutting edge formed by the close spacing of the opposed ends of adjoining segment fins for discharging forceful jets of water from said passageway directly into said spaces between the opposed ends of adjoining segment bodies and freely against the bottom of the kerf cut by the blade, whereby stone cuttings will be effectively flushed out of the kerf as fast as they are formed and replaced by clean water.

5. The combination of claim 4 together with means carried by the thin straight blade for preventing it from cutting a curved kerf in stone having a hard vein, said means comprising elongated diamond clearance strips spaced apart longitudinally along the intermediate portion of a long blade on each side of the latter, said clearance strips comprising thin strips of sheet metal having on one face a coating containing diamond particles, the other face being fixed to the outer faces of said outer plates at spaced intervals along the cutting edge of the blade and adjacent the said segment bodies, the cutting faces of said clearance strips being in the planes of the outer faces of said segment bodies.

6. In a laminated cutting blade, of the reciprocating type, for sawing stone or the like, the combination of
(a) a blade body with a closed internal water passageway, said blade body comprising
(1) two opposed metal outer plates,
(2) elongated metal spacing plates disposed between and united to said outer plates immediately adjacent the cutting edge, said spacing plates being arranged relative to each other in end-to-end spaced relation and forming a boundary for said passageway,
(3) means forming the remainder of the boundary of said passageway and means for making the major portion of said blade body solid, (b) elongated cutting segment bodies having diamond particles embedded in a matrix, said bodies being firmly united to said elongated spacing blades longitudinally thereof, and being disposed along the cutting edge in end-to-end spaced relation, said segment bodies being of greater transverse width than the thickness of the blade body, (c) said elongated spacing plates having their ends projecting beyond the ends of the segment bodies whereby spaces are formed along the cutting edge by the opposed ends of adjoining segment bodies, said spaces, when said blade is in a cut in a stone block, having free communication with the exterior on each side of the outer plates both between and above said segments, (d) restricted water discharge passages disposed along the cutting edge and formed between and by the close spacing of the ends of said elongated spacing plates, said passages opening at one end into said passageway and at the other end into said spaces formed between the opposed ends of adjoining segment bodies, and (e) means for supplying water under pressure to said passageway, whereby when the blade is reciprocated and water is supplied to the passageway, forceful jets of water will be freely discharged directly and freely into said spaces and against the bottom of the kerf to flush out stone cuttings, through said communication to the exterior, as fast as such cuttings are formed and to replace them by clear water.

References Cited by the Examiner

UNITED STATES PATENTS

| | | | |
|---|---|---|---|
| 163,879 | 6/75 | Morrison | 125—18 |
| 2,225,193 | 12/40 | Benner et al. | 51—206.4 |
| 2,535,184 | 12/50 | Wilson et al. | 51—206 X |
| 2,697,878 | 12/54 | Oberley | 51—267 X |
| 2,840,960 | 7/58 | Booth | 51—267 |

FOREIGN PATENTS

| | | |
|---|---|---|
| 1,258,694 | 3/61 | France. |
| 33,517 | 10/85 | Germany. |
| 427,369 | 4/35 | Great Britain. |
| 576,794 | 4/46 | Great Britain. |
| 580,867 | 9/46 | Great Britain. |
| 412,569 | 8/46 | Italy. |
| 15,680 | 4/03 | Sweden. |
| 99,479 | 7/40 | Sweden. |

LESTER M. SWINGLE, *Primary Examiner.*
JOHN C. CHRISTIE, *Examiner.*